United States Patent [19]

Paaso et al.

[11] Patent Number: 5,043,552
[45] Date of Patent: Aug. 27, 1991

[54] CUTTING ELECTRODE FOR UNDERWATER AND LAND USE

[76] Inventors: Charles Paaso, P.O. Box 868, Brighton, Mich. 48116; Bart Cariello, 512 Fenimore Ave., N. Babylon, N.Y. 11703; Anthony Palumbo, 95 LeBrun Ave., Amityville, N.Y. 11701

[21] Appl. No.: 465,338

[22] Filed: Jan. 16, 1990

[51] Int. Cl.$^5$ .............................................. B23K 35/06
[52] U.S. Cl. ........................................ 219/70; 219/72; 266/48
[58] Field of Search ............... 219/68, 69.1, 69.11, 219/70, 72, 69.15, 74; 266/48

[56] References Cited

U.S. PATENT DOCUMENTS

| | | | |
|---|---|---|---|
| 4,114,863 | 9/1978 | Campana | 266/48 |
| 4,393,297 | 7/1983 | Niinivaara | 219/70 |
| 4,541,616 | 9/1985 | Dean | 266/48 |
| 4,660,807 | 4/1987 | Campana | 219/70 |
| 4,697,791 | 10/1987 | Henderson et al. | 266/48 |
| 4,743,731 | 5/1988 | Seuring et al. | 219/69.15 |
| 4,973,809 | 11/1990 | Jenkins | 219/70 |

FOREIGN PATENT DOCUMENTS 1615365  11/1971  Fed. Rep. of Germany ........ 219/70

Primary Examiner—Geoffrey S. Evans
Attorney, Agent, or Firm—Michael I. Kroll

[57] ABSTRACT

The present invention relates to an exothermic cutting electrode. The electrode includes an outer hollow conductor, an inner conductor disposed inside the and outer hollow conductor. The inner conductor is configured so as to form the boundaries of two chambers and configured to form a third chamber between the outer hollow conductor and an inner conductor. The three chambers are of substantially equal cross-sectional size whereby even gas flow is prouded and even consumption of the electrode is provided.

1 Claim, 1 Drawing Sheet

CUTTING ELECTRODE FOR UNDERWATER AND LAND USE

DESCRIPTION OF THE PRIOR ART

The process of using a cutting torch to cut or gouge metal is well known. For example, U.S. Pat. No. 4,131,700 teaches an electric current from a source, controlled by a switch, is sent through the torch, down the electrode. An arc is struck on the object to be worked or on a striker plate. A gas, usually oxygen, is sent from a source through a regulator to the torch and down the electrode. The gas, ignited by the spark, continues to heat and melt the object material and the electrode. The gas stream also serves to remove slag from the cut.

There are many cutting electrodes for use underwater and on land using the oxygen arc method, mentioned, supra. There are minor differences among these electrodes, the length of the electrode, for example, or the thickness of the conductor wall of the electrode. The major differences are the configuration of the internal conductor inserted inside the outer conductor, or the material from which the electrode is made.

The internal configuration must allow even distribution of gas and surface area of the internal conductor so that the electrode consumes evenly and in a controlled manner. One side of the electrode can not be allowed to consume faster than the other side since this would render the electrode useless.

Additionally, enough gas must be allowed to pass through the electrode to remove the melted material or slag, especially, if the work is underwater since the melted material is immediately quenched and can remain in the cut. Underwater work is by its very nature dangerous and expensive. There exists a need for an underwater cutting electrode, made of a simple material which generates great heat and melts the object material quickly and with a wide kerf, to reduce the amount of time a worker needs to be underwater.

Numerous innovations for cutting electrodes for underwater and land use have been provided in the prior art that are adapted to be used. Even though these innovations may be suitable for the specific individual purposes to which they address, they would not be suitable for the purposes of the present invention as heretofore described.

SUMMARY OF THE INVENTION

Accordingly, it is an object of the present invention to provide a cutting electrode for underwater and land use that avoids the disadvantages of the prior art.

More particularly, it is an object of the present invention to provide a cutting electrode for underwater and land use which is consumable and can be inserted into a standard cutting torch.

The present invention is a cutting electrode of the oxygen arc type, made of simple material, mild steel for example, and is designed to fit standard cutting torches. The internal configuration allows gas to flow through the electrode evenly for controlled consumption and with sufficient force to remove slag and produce sufficiently high temperatures at the working end of the electrode to cut through most known materials quickly and easily.

In keeping with these objects, and with others which will become apparent hereinafter, one feature of the present invention resides, briefly stated, in an exothermic cutting electrode that includes an outer hollow conductor, an inner conductor inside the outer hollow conductor, the inner conductor being configured so as to form the boundaries of two chambers and configured to form a third chamber between the outer hollow conductor and an inner conductor wherein the three chambers are of substantially equal cross-sectional size.

When the cutting electrode for underwater and land use is designed in accordance with the present invention, even gas flow is produced and even consumption of the electrode is provided.

The novel features which are considered characteristic for the invention are set forth in particular in the appended claims. The invention itself, however, both as to its construction and its method of operation, together with additional objects and advantages thereof, will be best understood from the following description of the specific embodiments when read in connection with the accompanying drawing.

DETAILED DESCRIPTION OF THE PREFERRED EMBODIMENT

Figure 1:
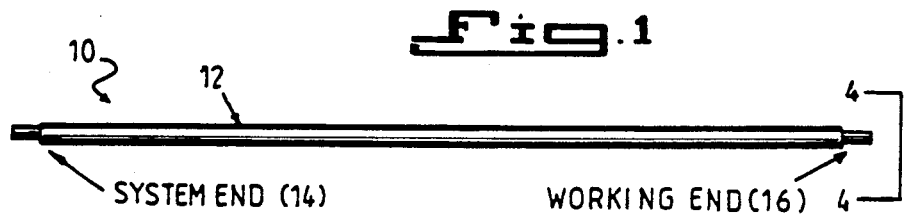
FIG. 1 is a plan view of the cutting electrode of the present invention.

Referring now to FIG. 1, the cutting electrode for underwater and land use of the present invention is shown generally at 10 and includes a main body 12 with a system end 14 and a working end 16.

Figure 2:
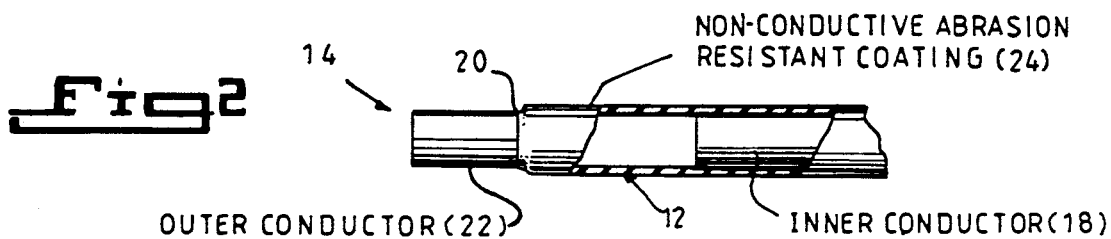
FIG. 2 is a cross sectional view of the coating and the inner and the outer conductors at the "system" end of the electrode of the present invention, shown in FIG. 1.

The details of the system end 14 can be seen in FIG. 2. The system end 14 includes an inner conductor 18 disposed within the main body 12 and terminating prior to the main body system end 20. Also included on the system end 14 is an outer conductor 22 which extends past the main body system end 20 of the main body 12. The main body 12 is coated with a non-conductive, abrasion-resistant coating 24.

Figure 4:
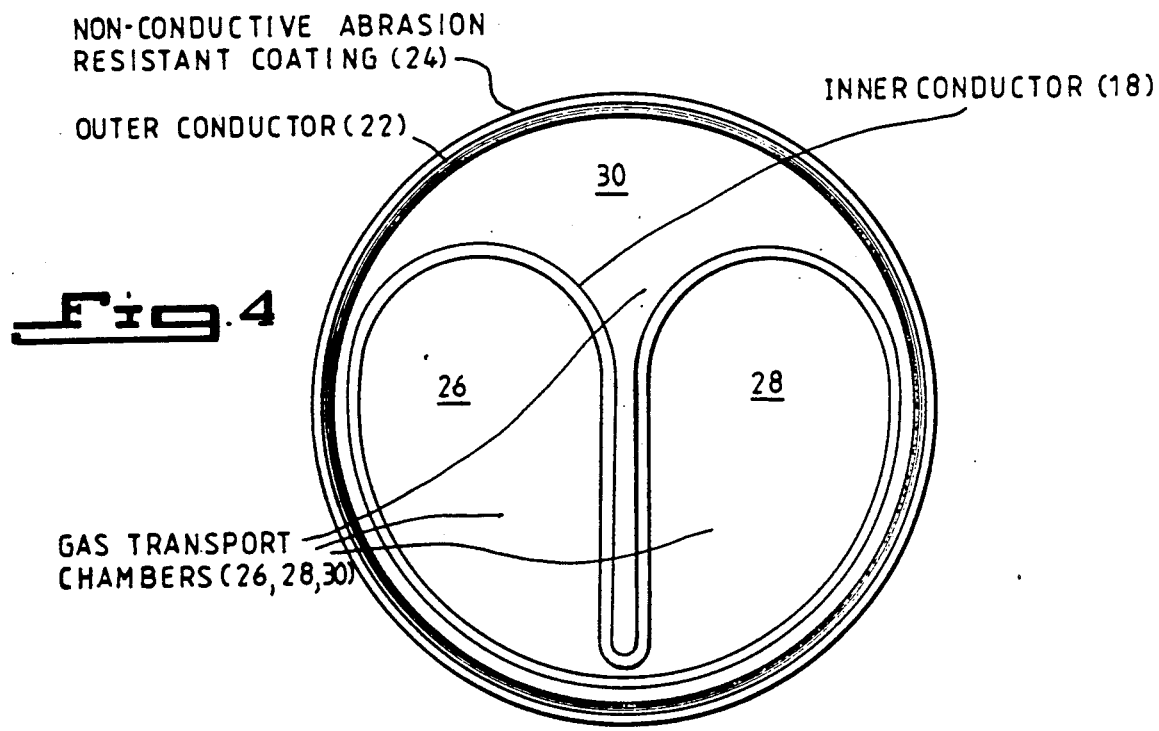
FIG. 4 is a cross sectional view along line 4—4 of FIG. 1 and showing the details of the inner and the outer conductors.

The cutting electrode for underwater and land use 10 is of the oxygen arc type. The outer conductor 22 is made of mild steel or other common metal. The inner conductor 18 is also made of mild steel or other common metal. The inner conductor 18 is made into a configuration of two substantially equal chambers 26 and 28, as shown in FIG. 4. The internal two substantially equal chambers 26 and 28 of the inner conductor 18, when placed inside the outer conductor 22, forms a third chamber 30, of a size substantially equally to the size of the two substantially equal chambers 26 and 28. Thus, the three chambers 26, 28, and 30, substantially formed by the inner conductor 18, are substantially equal.

The three resultant substantially equal chambers 26, 28, and 30 allow for a fairly even gas and electricity flow when the cutting electrode for underwater and land use 10 is in use with the standard cutting torch (not shown). The inner conductor 18 is shorter than the outer conductor 22 at the system end 14 of the cutting electrode for underwater and land use 10, as shown in FIG. 2, in order to prevent flashback so that the cutting electrode for underwater and land use 10 does not burn back into the torch (not shown). The outer conductor 22 is coated with an insulating material 24, usually vinyl, for underwater work. The electrode 10 is not insulated at the systems end 14 so that it can be fitted into the standard cutting torch (not shown).

Figure 3:
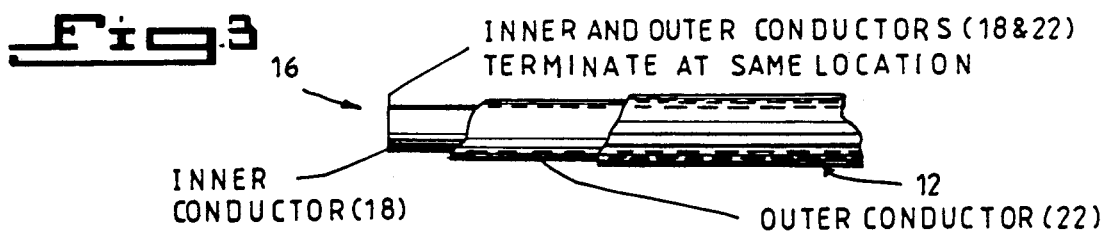
FIG. 3 is a cut-away view of the coating and the inner and the outer conductors at the "working" end of the electrode of the present invention, shown in FIG. 1.

The details of the working end 16 can be seen in FIG. 3. The tip of the working end 16 of the cutting electrode for underwater and land use 10 is also not insulated so as to allow for easier striking of an arc. After an arc is struck, and gas and electricity are flowing down the cutting electrode for underwater and land use 10, from a torch (not shown), the three substantially equal chambers 26, 28, and 30 generate temperatures capable of melting most material quickly, easily, and with a wide kerf which increases productivity.

It will be understood that each of the elements described above, or two or more together, may also find a useful application in other types of constructions differing from the type described above.

While the invention has been illustrated and described as embodied in cutting electrodes for underwater and land use, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An exothermic cutting electrode, comprising:
   a) an outer hollow conductor;
   b) an inner conductor inside said outer hollow conductor, said inner conductor being configured so as to form the boundaries of two chambers and configured to form a third chamber between the outer hollow conductor and the inner conductor; and
   c) the three chambers being of substantially equal cross-sectional size whereby even gas flow is produced and even consumption of the electrode.

* * * * *